(12) United States Patent
Chen et al.

(10) Patent No.: US 12,289,641 B2
(45) Date of Patent: Apr. 29, 2025

(54) FREQUENCY POINT CHANGING METHOD AND APPARATUS

(71) Applicant: ALIBABA GROUP HOLDING LIMITED, Grand Cayman (KY)

(72) Inventors: Wenbing Chen, Hangzhou (CN); Xiaobo Yu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 981 days.

(21) Appl. No.: 17/179,864

(22) Filed: Feb. 19, 2021

(65) Prior Publication Data

US 2021/0176667 A1 Jun. 10, 2021

Related U.S. Application Data

(63) Continuation of application No. PCT/CN2019/101285, filed on Aug. 19, 2019.

(30) Foreign Application Priority Data

Aug. 28, 2018 (CN) .......................... 201810991114.5

(51) Int. Cl.
*H04W 28/20* (2009.01)
*H04W 28/26* (2009.01)
(Continued)

(52) U.S. Cl.
CPC .......... *H04W 28/20* (2013.01); *H04W 28/26* (2013.01); *H04W 36/06* (2013.01); *H04W 72/0453* (2013.01)

(58) Field of Classification Search
None
See application file for complete search history.

(56) References Cited

U.S. PATENT DOCUMENTS

| 2006/0056344 A1* | 3/2006 | Roy ..................... H04W 36/304 370/329 |
| 2011/0065461 A1 | 3/2011 | Kang et al. |

(Continued)

FOREIGN PATENT DOCUMENTS

| CN | 102196452 A | 9/2011 |
| CN | 102457928 A | 5/2012 |

(Continued)

OTHER PUBLICATIONS

PCT International Search Report and Written Opinion mailed Nov. 13, 2019 issued in corresponding International Application No. PCT/CN2019/101285 (9 pgs.).

(Continued)

*Primary Examiner* — Otis L Thompson, Jr.
(74) *Attorney, Agent, or Firm* — Finnegan, Henderson, Farabow, Garrett & Dunner, LLP

(57) ABSTRACT

Embodiments of the present disclosure provide frequency point changing methods and apparatuses. The method can include: transmitting a first beacon frequency point request message to a first base station, the first beacon frequency point request message comprising first frequency point information, wherein the first base station is enabled to transmit the first beacon frequency point request message to a terminal, and the terminal is enabled to change a beacon frame receiving frequency point according to the first frequency point information in the first beacon frequency point request message; receiving a beacon frequency point acknowledgment message transmitted by at least one second base station; and transmitting a second beacon frequency point request message to the at least one second base station, the second beacon frequency point request message comprising the first frequency point information, wherein the at least one second base station is enabled to change a beacon transmitting frequency point according to the first frequency (Continued)

point information in the second beacon frequency point request message.

20 Claims, 12 Drawing Sheets

(51) Int. Cl.
  *H04W 36/06* (2009.01)
  *H04W 72/0453* (2023.01)

(56) References Cited

U.S. PATENT DOCUMENTS

| | | | | |
|---|---|---|---|---|
| 2013/0165112 A1* | 6/2013 | Gopalsamy | ............. | H04W 8/02 455/432.1 |
| 2013/0195022 A1* | 8/2013 | Nguyen | ................. | H04B 1/713 370/329 |
| 2014/0372502 A1* | 12/2014 | Shirakawa | .............. | H04L 67/10 709/201 |
| 2016/0044587 A1* | 2/2016 | Nagao | ................... | H04W 48/16 370/338 |
| 2018/0352569 A1* | 12/2018 | Hall | ....................... | H04L 5/0055 |
| 2019/0124659 A1* | 4/2019 | Wang | ................ | H04W 72/0453 |
| 2019/0223056 A1* | 7/2019 | Bajko | ................... | H04W 36/06 |

FOREIGN PATENT DOCUMENTS

| CN | 106793057 A | 5/2017 |
|---|---|---|
| WO | WO2018049683 A1 | 3/2018 |
| WO | WO 2020/042942 A1 | 3/2020 |

OTHER PUBLICATIONS

First Office Action issued in corresponding Chinese Application No. 201810991114.5 on Sep. 29, 2022 (6 pages).

* cited by examiner

```
┌─────────────────────────────────────────────────────────────┐
│ Transmit a first beacon frequency point request message to a first base station, the │
│ first beacon frequency point request message including first frequency point │
│ information, the first base station transmitting the first beacon frequency point │──── 301
│ request message to a terminal, and the terminal changing a beacon frame receiving │
│ frequency point according to the first frequency point information in the first │
│ beacon frequency point request message │
└─────────────────────────────────────────────────────────────┘
                                    │
┌─────────────────────────────────────────────────────────────┐
│ Receive a beacon frequency point acknowledgment message corresponding to the │
│ first beacon frequency point request message and transmitted by at least one │
│ second base station, the beacon frequency point acknowledgment message │──── 302
│ including base station position information of the at least one second base station │
│ and signal strength information of communication between the terminal and the at │
│ least one second base station │
└─────────────────────────────────────────────────────────────┘
                                    │
┌─────────────────────────────────────────────────────────────┐
│ Determine at least one target base station from the at least one second base station │──── 303
│ according to the base station position information and the signal strength information │
└─────────────────────────────────────────────────────────────┘
                                    │
┌─────────────────────────────────────────────────────────────┐
│ Transmit a second beacon frequency point request message to the at least one │
│ target base station, the second beacon frequency point request message including │
│ the first frequency point information, and the at least one target base station │──── 304
│ changing a beacon transmitting frequency point according to the first frequency │
│ point information │
└─────────────────────────────────────────────────────────────┘
```

*FIG. 3*

FREQUENCY POINT CHANGING METHOD AND APPARATUS

CROSS-REFERENCE TO RELATED APPLICATION

The present disclosure claims the benefits of priority to International Application No. PCT/CN2019/101285, filed on Aug. 19, 2019, which claims priority to Chinese Patent Application No. 201810991114.5 filed on Aug. 28, 2018, both of which are incorporated herein by reference in their entireties.

BACKGROUND

With the development of Internet of Things technologies, the Internet of Things has been widely used. The Internet of Things is a combination of a sensor network and the Internet. The sensor network includes a terminal. The Internet includes a base station and a server. After the terminal transmits a wireless signal, the base station receives the wireless signal and transmits the wireless signal to the base station. LoRa (Long Range) is an ultra-long-distance transmission scheme based on spread spectrum technologies in the Internet of Things. LoRa has the characteristics of long distance transmission, low power consumption, multiple nodes, and low cost. The base station can be referred to as a gateway, and the server can also be referred to as a network server.

In a LoRaWAN (Long Range Wide Area Network) system, the base station can communicate with a plurality of terminals. The base station allocates a communication channel, e.g., a frequency point, for each terminal. The terminals communicate with the base station through different frequency points. In order to effectively utilize resources of the frequency points, the server allocates the frequency points uniformly. To change a frequency point of a terminal, the server transmits a beacon frequency request (e.g., BeaconFreqReq) command to the base station before the change, and then forwards the beacon frequency request to the terminal through the base station such that the terminal changes the frequency point based on the beacon frequency request. However, the base station is not informed that a frequency point of the terminal has been changed. As a result, the base station transmits messages to the terminal on the original frequency point. Since the terminal has changed the frequency point, data frames sent via the original frequency point from the bast station are not received by the terminal.

SUMMARY

Embodiments of the present disclosure provide frequency point changing methods and apparatuses. The method can include: transmitting a first beacon frequency point request message to a first base station, the first beacon frequency point request message comprising first frequency point information, wherein the first base station is enabled to transmit the first beacon frequency point request message to a terminal, and the terminal is enabled to change a beacon frame receiving frequency point according to the first frequency point information in the first beacon frequency point request message; receiving a beacon frequency point acknowledgment message transmitted by at least one second base station; and transmitting a second beacon frequency point request message to the at least one second base station, the second beacon frequency point request message comprising the first frequency point information, wherein the at least one second base station is enabled to change a beacon transmitting frequency point according to the first frequency point information in the second beacon frequency point request message.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 3 is a flowchart of an exemplary frequency point changing method, consistent with some embodiments of the present disclosure.

DETAILED DESCRIPTION

Figure 1:
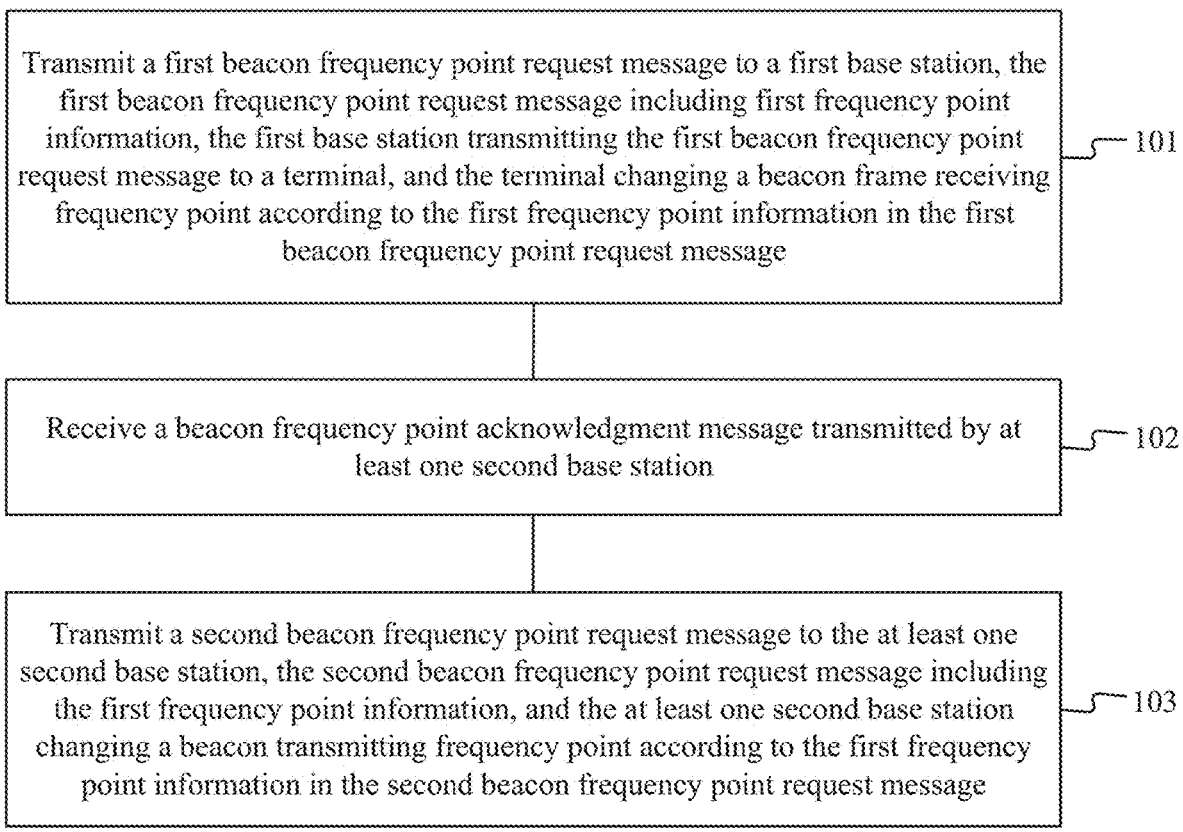
FIG. 1 is a flowchart of an exemplary frequency point changing method, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

The embodiments of the present disclosure provide the following advantages.

As described above, a server transmits a first beacon frequency point request message to a first base station. The first beacon frequency point request message includes first frequency point information. The first base station transmits the first beacon frequency point request message to a terminal. The terminal changes a beacon frame receiving frequency point according to the first frequency point information in the first beacon frequency point request message. The problem lies in that after the terminal changes the frequency point, the base station is not informed of the changed frequency point and continues transmitting data frames to the terminal at the frequency point before the change, and the terminal is not able to receive these data frames.

According to some embodiments of the present disclosure, after receiving a beacon frequency point acknowledgment message indicating that the terminal changes the frequency point according to the first beacon frequency point request message, the server timely transmits a second beacon frequency point request message to the base station to instruct the base station to change a frequency point, such that the base station can communicate with the terminal on the changed frequency point. In the embodiments, the server instructs the base station to change the frequency point after receiving acknowledgement of the frequency point being changed by the terminal. The base station can be the first base station that previously transmits the first beacon frequency point request message to the terminal or a second base station different from the first base station.

In some embodiments, changing the beacon frame receiving frequency point can include synchronizing the beacon frame receiving frequency point. The terminal or the base station can synchronize its own beacon frame receiving frequency point or beacon frame transmitting frequency point according to the received beacon frequency point request message.

According to some other embodiments of the present disclosure, after receiving a beacon frequency point acknowledgment message indicating that the terminal changes a frequency point according to the first beacon frequency point request message, the server calculates a moving trajectory of the terminal according to a position of a current base station and a signal strength of communication between the current base station and the terminal in the beacon frequency point acknowledgment message, so as to determine a target base station, and timely transmits a second beacon frequency point request message to the target base station to instruct the target base station to change a frequency point, so that the target base station can communicate with the terminal on a correct frequency point.

In some embodiments of the present disclosure, after receiving a third beacon frequency point request message transmitted by a server, a base station transmits a beacon message including first frequency point information or a delay time to a terminal, the base station timely changes a beacon transmitting frequency point according to the first frequency point information in the third beacon frequency point request message or changes a beacon transmitting frequency point after the timeout of the delay time, and the terminal timely changes a frequency point according to the first frequency point information in the beacon message or changes a frequency point after the timeout of the delay time, so that the base station and the terminal can communicate with each other through the changed frequency point. The target base station is informed with the changed frequency point and is configured to transmit data frames at the changed frequency point.

FIG. 1 is a flowchart of an exemplary frequency point changing method, consistent with some embodiments of the present disclosure. The method can be applicable to a wireless network. The wireless network includes a terminal, a server, and a base station connected to the terminal and the server. The method can specifically include the following steps:

In step 101, transmitting a first beacon frequency point request message to a first base station is performed, the first beacon frequency point request message including first frequency point information, the first base station transmitting the first beacon frequency point request message to a terminal, and the terminal changing a beacon frame receiving frequency point according to the first frequency point information in the first beacon frequency point request message. In some embodiments, the beacon message can also be referred to as a beacon frame.

In the Internet of Things, three levels: a perception layer, a network layer, and an application layer, can be included. The perception layer is composed of various terminals, which can include, for example, a temperature and humidity sensor, a QR code labeling machine, a camera, an infrared sensor, a GPS, and other perception terminals. The perception layer is a source for the Internet of Things to identify objects and collect data. The terminal can be provided with a LoRa wireless module, and the LoRa wireless module transmits the collected data to the network layer or receives data from the network layer. According to a communication mode of the LoRa wireless module, different terminals can access the network layer through different frequency points.

The network layer is composed of various networks, including the Internet, a broadcasting and television network, a network management system, a cloud computing platform, and the like, is a hub of the entire Internet of Things, and is responsible for transmitting and processing information acquired by the perception layer. In particular, the network layer includes a base station and a server. The base station is connected to the server, the base station communicates with different terminals through different frequency points, and the server uniformly allocates communication channels of the base station, that is, controls the base station to communicate with the terminals through different frequency points.

Specifically, the server can allocate communication frequency points of each base station and the terminal according to the amount of uplink and downlink data, frequency interference information, or the like. For example, in a peak period of data processing, a frequency point with smaller bandwidth can be changed to a frequency point with larger bandwidth to meet requirements of data communication, or in the case of sparse data processing, a frequency point with larger bandwidth is changed to a frequency point with smaller bandwidth, so as to avoid wasting channel resources and timeslot resources. The server can be provided with a list of frequency points. The list includes numbers of the frequency points, bandwidth of the frequency points, frequency ranges, and the like. When a frequency point needs to be changed, address information of the terminal and target frequency point information can be put into a first beacon frequency point request message, and the first beacon frequency point request message is transmitted to the base station.

In particular, the first beacon frequency point request message is a medium access control (MAC) command issued by a network server. The first frequency point information can be a piece of new beacon frame frequency point information. The network server transmits the first beacon frequency point request message to the terminal through the base station, so that the terminal can use the first frequency point information to update its own beacon frame receiving frequency point. In some embodiments, frequency point information refers to channel frequency information of a beacon frame. Optionally, the first beacon frequency point request message (BeaconFreqReq) can carry the first frequency point information. The first frequency point information can be an unsigned integer number of 24 bits. Optionally, an actual beacon frequency can be an integer multiple of 100 megahertz (MHz). After receiving the first beacon frequency point request message, the terminal can check whether beacon frequency information carried therein can be implemented by a wireless hardware module. If not, the terminal needs to send error information to the server through the base station. A beacon can also be referred to as a beacon frame.

In some embodiments, step 101 can include the following sub-steps:

In sub-step S1011, determining a first base station corresponding to the terminal according to address information of the terminal is performed.

The address information of the terminal can be a device extended unique identifier (DevEUI) or a device address (DevAddr), or it can be a DevEUI and a DevAddr. A first base station corresponding to device address information or a device extended unique identifier can be found according to the device extended unique identifier or device address information.

In sub-step S1012, transmitting the first beacon frequency point request message to the first base station is performed, the first base station transmitting the first beacon frequency point request message to the terminal.

After the first base station corresponding to the terminal is determined, the first beacon frequency point request message can be transmitted to the first base station.

In step 102, receiving a beacon frequency point acknowledgment message transmitted by at least one second base station is performed.

In some embodiments, after receiving the first beacon frequency point request message, the terminal can change a frequency point according to the first beacon frequency point request message, and the terminal changing a frequency point can include the following steps: receiving a first beacon frequency point request message transmitted by the base station, acquiring first frequency point information in the first beacon frequency point request message, and changing, by the terminal, a current beacon frame receiving frequency point to a frequency point corresponding to the first frequency point information.

The terminal receives a data frame. Therefore, the first beacon frequency point request message received from the base station needs to be parsed to acquire the first frequency point information therein. After obtaining the first frequency point information, the terminal changes a current beacon frame receiving frequency point to a frequency point corresponding to the first frequency point information.

After receiving the first beacon frequency point request message, the terminal updates the beacon frame receiving frequency point according to the first frequency point information in the first beacon frequency point request message. Moreover, after the change is completed, a beacon frequency point acknowledgment message is generated. The beacon frequency point acknowledgment message is a status message of the terminal, which can be, for example, a frequency point change confirmation message generated by the terminal for the frequency point change. After generating the beacon frequency point acknowledgment message, the terminal transmits the beacon frequency point acknowledgment message to the base station. Optionally, after receiving the first beacon frequency point request message, the terminal can also first generate a beacon frequency point acknowledgment message, and then update the beacon frame receiving frequency point according to the first frequency point information in the first beacon frequency point request message.

In some embodiments, the terminal can uplink the beacon frequency point acknowledgment message to a plurality of second base stations, and the server can receive the beacon frequency point acknowledgment message from at least one second base station.

In some embodiments, after receiving the beacon frequency point acknowledgment message, the second base station transmits a base station identifier, e.g., a Gateway Extended Unique Identifier (GWEUI) together with the beacon frequency point acknowledgment message to the server. Specifically, the second base station writes the base station identifier into a JavaScript Object Notation (JSON) field of the beacon frequency point acknowledgment message and transmits the beacon frequency point acknowledgment message to the server, and the server can receive the beacon frequency point acknowledgment message and the base station identifier.

The network server can transmit a downlink data frame to the terminal through the first base station. The downlink data frame can be transmitted in the form of unicast. The network server transmits only the downlink data frame to the first base station, and the first base station transmits the downlink data frame to the terminal through a wireless air interface. In particular, the network server can determine the first base station according to terminal uplink data frames transmitted by a plurality of base stations and received signal strength information. The first base station can be a base station with the strongest received signal strength. Since the terminal transmits the uplink data frame in the form of broadcast, there can be a plurality of second base stations receiving and forwarding the uplink data frame to the network server. Therefore, the first base station and the second base station can or cannot be the same base station.

In step 103, transmitting a second beacon frequency point request message to the at least one second base station is performed, the second beacon frequency point request message including the first frequency point information, and the at least one second base station changing a beacon transmitting frequency point according to the first frequency point information in the second beacon frequency point request message.

In particular, the second beacon frequency point request message is a request message transmitted by the network server to the base station, and the base station can acquire the second beacon frequency point request message and identify that the GWEUI is its own GWEUI. Then, its own beacon transmitting frequency point is changed according to the first frequency point information in the second beacon frequency point request message. Optionally, the second beacon frequency point request message can be encrypted with a key negotiated or preset between the network server and the base station. Optionally, the negotiated or preset key can be a session key. The session key can be dynamically generated.

In particular, if some terminals under the coverage of the second base station have not changed the beacon frame receiving frequency point in time after the second base station changes the beacon transmitting frequency point, the terminals cannot accurately receive a beacon frame after the second base station transmits the beacon frame on the changed frequency point. Therefore, to solve this problem, the server can maintain a list of terminal beacon frequency points. When receiving a beacon frequency point acknowledgment message transmitted by the terminal, the server changes frequency point information of the corresponding terminal in the list of beacon frequency points according to a terminal identifier in the acknowledgment message. After the server determines that the terminals that have successfully changed the frequency point information reach a first threshold, the server transmits a second beacon frequency point request message to at least one second base station. For example, the first threshold can be 80% or the like. Optionally, the terminal can also determine that the beacon frame is not received within a specified time, and then transmit a beacon frequency point information request message to the server through the second base station. The beacon frequency point information request message includes existing beacon frequency point information of the terminal. After receiving the beacon frequency point information request message, the server transmits the first beacon frequency point request message to the terminal through one of the second base stations, and the terminal updates the beacon frame receiving frequency point according to the frequency point information in the first beacon frequency point request message.

In some embodiments, the beacon frequency point acknowledgment message includes status information of the terminal, the status information includes frequency point change confirmation information, and then step 103 can include the following sub-steps:

In sub-step S1031, receiving the beacon frequency point acknowledgment message and a base station identifier transmitted by the at least one second base station is performed.

In sub-step S1032, determining at least one target base station from the at least one second base station according to at least one base station identifier is performed.

In sub-step S1033, transmitting the second beacon frequency point request message to the at least one target base station is performed, the second beacon frequency point request message including the first frequency point information, so that the target base station changes the beacon transmitting frequency point according to the first frequency point information.

In some embodiments, the server can change frequency points of a plurality of base stations at the same time. When receiving a beacon frequency point acknowledgment message and a base station identifier, the server determines, according to the base station identifier, a second base station whose frequency point needs to be changed, generates a second beacon frequency point request message including first frequency point information, and then transmits the second beacon frequency point request message to the second base station to instruct the second base station to change the frequency point. More preferably, the second beacon frequency point request message can include a delay time to instruct the second base station to change a current frequency point to a frequency point corresponding to the first frequency point information after the timeout of the delay time, so that the second base station can communicate with a terminal through the changed beacon frequency point.

In some embodiments, a server transmits a first beacon frequency point request message to a first base station. The first beacon frequency point request message includes first frequency point information. The first base station transmits the first beacon frequency point request message to a terminal. The terminal changes a beacon frame receiving frequency point according to the first frequency point information in the first beacon frequency point request message. After receiving a beacon frequency point acknowledgment message indicating that the terminal changes a frequency point according to the first beacon frequency point request message, the server timely transmits a second beacon frequency point request message to a base station to instruct the base station to change a frequency point, so that the base station can communicate with the terminal on a correct frequency point, which improves the communication efficiency.

In some embodiments, the base station whose frequency point needs to be changed is determined through the base station identifier, the second beacon frequency point request message can be transmitted to a correct base station, and the base station is instructed to change the frequency point, which is suitable for scenarios of one-to-one frequency point change and is highly targeted.

Figure 2:
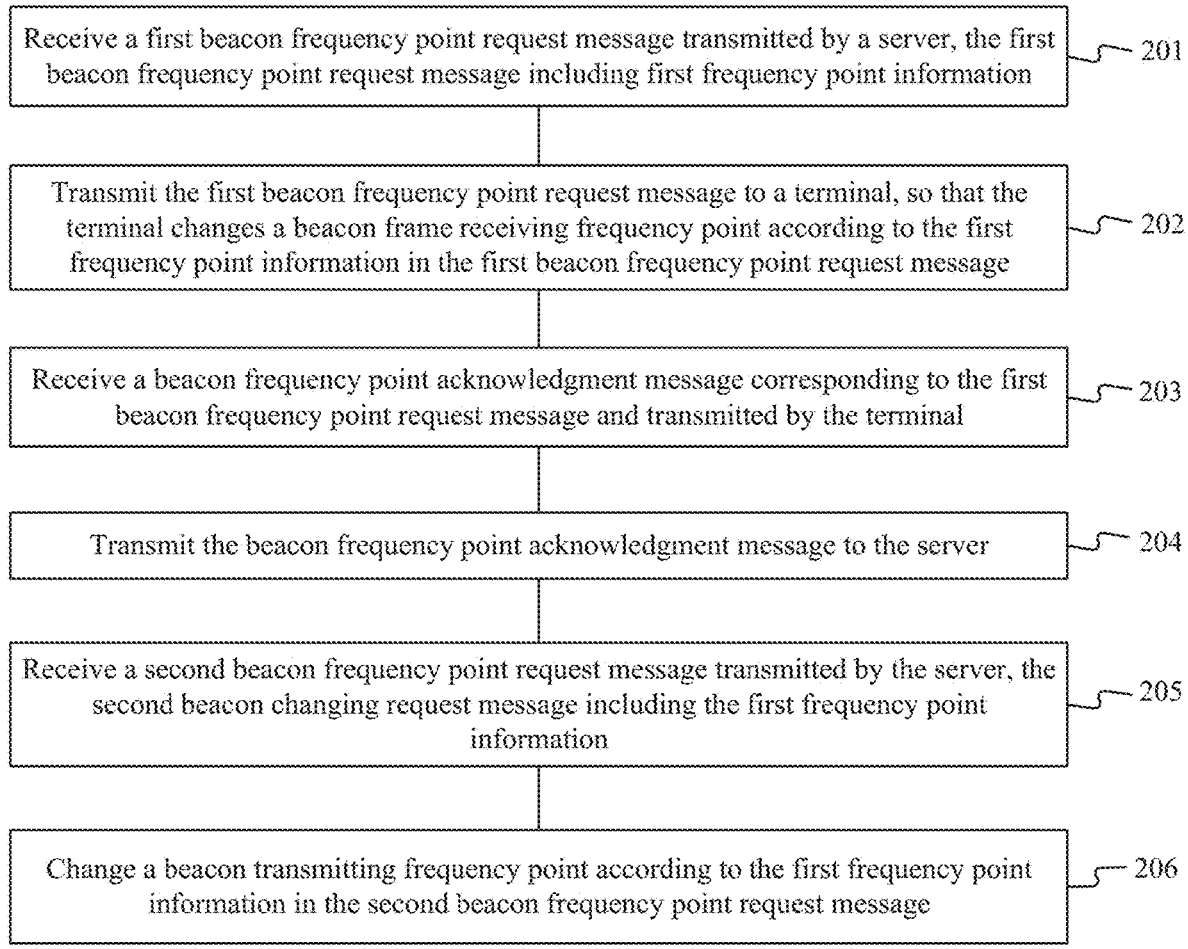
FIG. 2 is a flowchart of an exemplary frequency point changing method, consistent with some embodiments of the present disclosure.

FIG. 2 is a flowchart of an exemplary frequency point changing method, consistent with some embodiments of the present disclosure. The frequency point changing method is applicable to a wireless network. The wireless network includes a terminal, a server, and a base station connected to the terminal and the server. The method can specifically include the following steps:

In step 201, receiving a first beacon frequency point request message transmitted by a server, the first beacon frequency point request message including first frequency point information is performed.

In some embodiments, the base station is connected to the server. When the server needs to instruct the terminal to change a frequency point, the server can transmit a first beacon frequency point request message to a base station corresponding to the terminal, and the base station can receive the first beacon frequency point request message transmitted by the server. The first beacon frequency point request message includes address information of the terminal and the first frequency point information. The address information of the terminal can be a device extended unique identifier (DevEUI) or a device address (DevAddr). The base station corresponding to the terminal can be a base station that a network server determines has the highest received signal strength among all terminal uplink data frames received.

In step 202, transmitting the first beacon frequency point request message to a terminal is performed, so that the terminal changes a beacon frame receiving frequency point according to the first frequency point information in the first beacon frequency point request message.

Specifically, step 202 can include the following sub-steps:

In sub-step S2021, determining a target terminal according to the address information is performed.

In particular, the address information of the terminal can be a device extended unique identifier (DevEUI) or a device address (DevAddr).

In sub-step S2022, transmitting the first beacon frequency point request message to the target terminal is performed.

The terminal is connected to the base station through a wireless air interface. After receiving the first beacon frequency point request message transmitted by the server, the base station can determine the target terminal according to the address information in the first beacon frequency point request message and transmit the first beacon frequency point request message to the target terminal. The target terminal changes a frequency point after receiving the first beacon frequency point request message, which can specifically include: receiving the first beacon frequency point request message transmitted by the base station, and parsing the first beacon frequency point request message to acquire the first frequency point information in the first beacon frequency point request message; and changing, by the terminal, a current beacon frame receiving frequency point to a frequency point corresponding to the first frequency point information.

The terminal receives a data frame. Therefore, the first beacon frequency point request message received from the base station needs to be parsed to obtain a target frequency point therein. After obtaining the target frequency point, the terminal changes the current beacon frame receiving frequency point to the target frequency point.

The terminal generates a beacon frequency point acknowledgment message after receiving the first beacon frequency point request message. The beacon frequency point acknowledgment message is a status message of the terminal, which can be, for example, frequency point change confirmation information. After generating the beacon frequency point acknowledgment message, the terminal transmits the beacon frequency point acknowledgment message to the base station.

In step 203, receiving a beacon frequency point acknowledgment message corresponding to the first beacon frequency point request message and transmitted by the terminal is performed.

The beacon frequency point acknowledgment message transmitted by the terminal can include a status message of the terminal. In some embodiments, the terminal can uplink the beacon frequency point acknowledgment message to a plurality of base stations, and the plurality of base stations receive the beacon frequency point acknowledgment message uplinked by the terminal.

In step 204, transmitting the beacon frequency point acknowledgment message to the server is performed.

In some embodiments, the base station identifier of the base station can be transmitted to the server. In particular, after receiving the beacon frequency point acknowledgment message transmitted by the terminal, the base station can acquire a base station identifier of the base station and write the base station identifier (GWEUI) into the beacon frequency point acknowledgment message. For example, the base station writes the base station identifier into a JSON field of the beacon frequency point acknowledgment message, and transmits the beacon frequency point acknowledgment message and the base station identifier to the server.

The base station transmits the beacon frequency point acknowledgment message and the base station identifier to the server. When receiving the beacon frequency point acknowledgment message and the base station identifier, the server determines, according to the base station identifier, a target base station whose frequency point needs to be changed, to transmit a second beacon frequency point request message to the target base station.

In step 205, receiving a second beacon frequency point request message transmitted by the server, the second beacon frequency point request message including the first frequency point information is performed.

In some embodiments, the server determines a target base station according to the base station identifier in the beacon frequency point acknowledgment message, and after determining according to frequency point change confirmation information of the terminal that a frequency point can be changed, generates a second beacon frequency point request message including the first frequency point information, and transmits the second beacon frequency point request message to at least one target base station corresponding to the base station identifier. The at least one target base station can receive the second beacon frequency point request message.

In step 206, changing a beacon transmitting frequency point according to the first frequency point information in the second beacon frequency point request message is performed.

After receiving the second beacon frequency point request message, the target base station can change a current beacon frequency point according to the first frequency point information in the second beacon frequency point request message.

In some embodiments, the second beacon frequency point request message further includes a delay time, and the target base station can change the beacon transmitting frequency point according to the first frequency point information and after the timeout of the delay time. For example, the delay time can be 2 beacon periods, and the target base station can change the current beacon transmitting frequency point to a frequency point corresponding to the first frequency point information after 2 beacon periods.

In some embodiments, a base station receives a first beacon frequency point request message transmitted by a server, and transmits the first beacon frequency point request message to a terminal, so that the terminal changes a beacon frame receiving frequency point according to first frequency point information in the first beacon frequency point request message. A beacon frequency point acknowledgment message corresponding to the first beacon frequency point request message and transmitted by the terminal is received, the beacon frequency point acknowledgment message is transmitted to the server, a second beacon frequency point request message transmitted by the server is received, and a beacon transmitting frequency point is changed according to first frequency point information in the second beacon frequency point request message, so that the base station can communicate with the terminal on a correct frequency point, which improves the communication efficiency.

In some embodiments, the base station transmits the beacon frequency point acknowledgment message and a base station identifier to the server, so that the server can determine a target base station according to the base station identifier, and can transmit the second beacon frequency point request message to a correct base station to instruct the base station to change the beacon transmitting frequency point, which is suitable for scenarios of one-to-one frequency point change and is highly targeted.

FIG. 3 is a flowchart of an exemplary frequency point changing method, consistent with some embodiments of the present disclosure. The frequency point changing method is applicable to a wireless network. The wireless network includes a terminal, a server, and a base station connected to the terminal and the server. The method can specifically include the following steps:

In step 301, transmitting a first beacon frequency point request message to a first base station is performed, the first beacon frequency point request message including first frequency point information, the first base station transmitting the first beacon frequency point request message to a terminal, and the terminal changing a beacon frame receiving frequency point according to the first frequency point information in the first beacon frequency point request message.

The server can allocate communication frequency points of each base station and the terminal according to the amount of data processed, frequency interference information, or the like. For example, in a peak period of data processing, a frequency point with smaller bandwidth can be changed to a frequency point with larger bandwidth to meet requirements of data communication, or in the case of sparse data processing, a frequency point with larger bandwidth is changed to a frequency point with smaller bandwidth, so as to avoid wasting channel resources and timeslot resources. The server can be provided with a list of frequency points. The list includes numbers of the frequency points, bandwidth of the frequency points, frequency ranges, and the like. When a frequency point needs to be changed, address information of the terminal and first frequency point information can be included in a first beacon frequency point request message, and the first beacon frequency point request message is transmitted to the base station.

In some embodiments, step 301 can include the following steps: determining a first base station corresponding to the terminal according to the address information; and transmitting the first beacon frequency point request message to the first base station, and transmitting, by the first base station, the first beacon frequency point request message to the terminal.

The terminal is wirelessly connected to the first base station, and the first base station is connected to the server. The first base station to which the terminal corresponding to an address in the address information is connected can be found in a gateway according to the address information. After the first base station corresponding to the terminal is determined, the first beacon frequency point request message can be transmitted to the first base station.

In step 302, receiving a beacon frequency point acknowledgment message corresponding to the first beacon frequency point request message and transmitted by at least one second base station is performed, the beacon frequency point acknowledgment message comprising base station position information of the at least one second base station and signal strength information of communication between the terminal and the at least one second base station.

After receiving the first beacon frequency point request message, the terminal can change the beacon frame receiving frequency point according to the frequency point information in the first beacon frequency point request message, which can specifically include: receiving a first beacon frequency point request message transmitted by a first base station, and acquiring the first frequency point information in the first beacon frequency point request message; and changing a current beacon frame receiving frequency point of the terminal to a frequency point corresponding to the first frequency point information.

The terminal generates a corresponding beacon frequency point acknowledgment message after receiving the first beacon frequency point request message, and transmits the beacon frequency point acknowledgment message to the base station. The beacon frequency point acknowledgment message is a status message of the terminal, which can be, for example, a frequency point change confirmation information indicating whether the terminal has changed a frequency point or indicating that the terminal changes a frequency point after the timeout of an agreed delay time, or the like.

In some embodiments, the terminal is movable, and the terminal can uplink the beacon frequency point acknowledgment message to a plurality of base stations during the movement, and the plurality of base stations receive the beacon frequency point acknowledgment message uplinked by the terminal.

After receiving the beacon frequency point acknowledgment message, the base station transmits a base station identifier (e.g., GWEUI), the position of the base station, and a signal strength of communication between the terminal and the base station together with the beacon frequency point acknowledgment message to the server. Specifically, the base station writes the base station identifier, the position of the base station, and the signal strength into a JSON field of the beacon frequency point acknowledgment message, and transmits the beacon frequency point acknowledgment message to the server, and the server can receive the beacon frequency point acknowledgment message.

In step 303, determining at least one target base station from the at least one second base station according to the base station position information and the signal strength information is performed.

In some embodiments, the terminal can be a mobile terminal, that is, the terminal can move from one area to another area, for example, a tracking terminal for express parcels in an express service, which can move from one geographic area to another geographic area. Base stations communicating with it also change accordingly. Therefore, a target base station needs to be determined according to a current base station position and a signal strength of a current base station. Then step 303 can include the following sub-steps.

In sub-step S3031, calculating a moving trajectory of the terminal according to the base station position and the signal strength is performed.

In sub-step S3032, determining a base station within a preset distance from the moving trajectory as the target base station is performed.

Distances between a terminal and base stations are different, and signal strengths of communication between the terminal and the base stations are also different. A moving trajectory of the terminal can be predicted based on a base station position of a current base station and signal strength, and a base station within a preset distance can be determined as a target base station. For example, if a signal strength between the terminal and base station A is getting weaker and a signal strength with the terminal and base station B is getting stronger, it can be predicted that the terminal moves from a coverage area of base station A to a coverage area of base station B, that is, its moving trajectory is to move from base station A to base station B. A base station within a preset distance on the trajectory can be determined as the target base station. For example, the preset distance is a distance when a distance from the terminal to base station B is less than a distance from the terminal to base station A. Optionally, the server can calculate or predict the moving trajectory of the terminal according to the signal strength of a terminal message received by each base station, determine a target base station corresponding to the moving trajectory, and transmit a second beacon frequency point request message to the at least one target base station. Optionally, the target base station cannot be a base station that can currently receive uplink data of the terminal. The target base station is on the moving trajectory of the terminal predicted by the server.

In step 304, transmitting a second beacon frequency point request message to the at least one target base station is performed, the second beacon frequency point request message including the first frequency point information, and the at least one target base station changing a beacon transmitting frequency point according to the first frequency point information.

In some embodiments, the beacon frequency point acknowledgment message includes status information of the terminal, and the status information includes a frequency point change confirmation information of the terminal for frequency point change. The frequency point change confirmation information can be information representing the time when the terminal can change a frequency point. The server can determine, according to the frequency point change confirmation information, the time when the target base station changes the beacon transmitting frequency point, and then generate a second beacon frequency point request message and transmit it to the target base station, to instruct the target base station to change the beacon transmitting frequency point according to the first frequency point information in the second beacon frequency point request message.

Preferably, the second beacon frequency point request message includes a delay time, so that the target base station changes the beacon transmitting frequency point after the timeout of the delay time according to the first frequency point information.

In some embodiments, a server transmits a first beacon frequency point request message to a first base station. The first beacon frequency point request message includes first frequency point information, and the first base station transmits the first beacon frequency point request message to the terminal. The terminal changes a beacon frame receiving frequency point according to the first frequency point information in the first beacon frequency point request message. After receiving a beacon frequency point acknowledgment message indicating that the terminal changes a frequency point according to the first beacon frequency point request message, the server calculates a moving trajectory of the terminal according to a position of a current base station and a signal strength of communication between the current base station and the terminal in the beacon frequency point acknowledgment message, so as to determine a target base station, and timely transmits a second beacon frequency point request message to the target base station to instruct the target base station to change the frequency point to be suitable for a scenario of the movement of the terminal, so that the target base station can communicate with the terminal on a correct frequency point after the terminal moves to a coverage area of the target base station.

Figure 4:
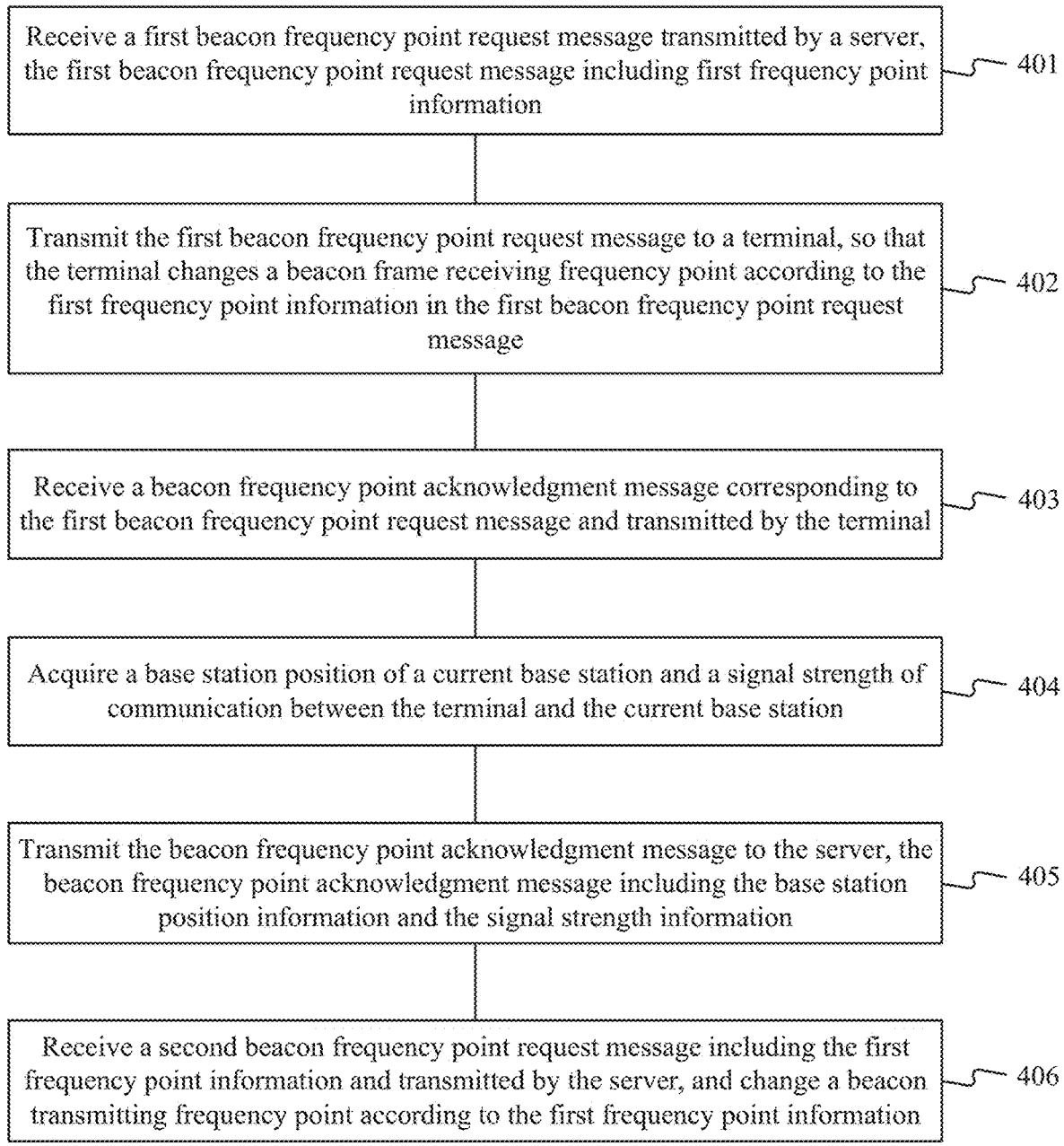
FIG. 4 is a flowchart of an exemplary frequency point changing method, consistent with some embodiments of the present disclosure.

FIG. 4 is a flowchart of an exemplary frequency point changing method, consistent with some embodiments of the present disclosure. The frequency point changing method is applicable to a wireless network. The wireless network includes a terminal, a server, and a base station connected to the terminal and the server. The method can specifically include the following steps:

In step 401, receiving a first beacon frequency point request message transmitted by a server, the first beacon frequency point request message including first frequency point information is performed.

In step 402, transmitting the first beacon frequency point request message to a terminal is performed, so that the terminal changes a beacon frame receiving frequency point according to the first frequency point information in the first beacon frequency point request message.

The terminal receives a data frame. Therefore, the first beacon frequency point request message received from the base station needs to be parsed to acquire the first frequency point information. The terminal changes a current frequency point to a frequency point corresponding to the first frequency point information.

The terminal generates a beacon frequency point acknowledgment message after receiving the first beacon frequency point request message, and transmits the beacon frequency point acknowledgment message to the base station. The beacon frequency point acknowledgment message is a status message of the terminal, which can be, for example, a frequency point change confirmation information of the terminal for frequency point change.

In step 403, receiving a beacon frequency point acknowledgment message corresponding to the first beacon frequency point request message and transmitted by the terminal is performed.

In step 404, acquiring a base station position of a current base station and a signal strength of communication between the terminal and the current base station is performed.

In some embodiments, a base station identifier and a base station position of the current base station can also be obtained. The base station position can be geographic position information, such as latitude and longitude information of the base station, and a signal strength of communication between the base station and the terminal is acquired at the same time.

In step 405, transmitting the beacon frequency point acknowledgment message to the server is performed, the beacon frequency point acknowledgment message comprising the base station position information and the signal strength information.

The base station can write the base station identifier, the base station position, and the signal strength into the beacon frequency point acknowledgment message, and then transmit the beacon frequency point acknowledgment message to the server. The server can receive the beacon frequency point acknowledgment message, and the server calculates a moving trajectory of the terminal according to the base station identifier, the base station position, and the signal strength in the beacon frequency point acknowledgment message, determines a target base station to which the terminal moves, generates a second beacon frequency point request message according to the frequency point change confirmation information of the terminal in the beacon frequency point acknowledgment message, and transmits the second beacon frequency point request message to the target base station, to instruct the target base station to change a beacon transmitting frequency point. Optionally, the server can calculate or predict the moving trajectory of the terminal according to the signal strength of a terminal message received by each base station, determine a target base station corresponding to the moving trajectory, and transmit a second beacon frequency point request message to the at least one target base station. Optionally, the target base station is not a base station that can currently receive uplink data of the terminal. The target base station is on the moving trajectory of the terminal predicted by the server.

In step 406, receiving a second beacon frequency point request message including the first frequency point information and transmitted by the server, and changing a beacon transmitting frequency point according to the first frequency point information is performed.

In some embodiments, the second beacon frequency point request message further includes a delay time, and step 406 can include: changing the beacon transmitting frequency point according to the first frequency point information and after the timeout of the delay time.

For example, the delay time can be 2 beacon periods, and the base station can change the current beacon transmitting frequency point to a frequency point corresponding to the first frequency point information after 2 beacon periods.

In some embodiments, the second beacon frequency point request message includes a change time, and step 406 can include: acquiring a current time, and if the current time is the change time, changing the beacon transmitting frequency point according to the first frequency point information.

Specifically, in some embodiments, the base station can set a timer after receiving the second beacon frequency point request message and parse the second beacon frequency point request message to acquire a change time and the first frequency point information. After acquiring the current time, the target base station determines whether the current time is the change time, and if the current time is the change time, changes the current beacon transmitting frequency point to a frequency point corresponding to the first frequency point information, so that the beacon transmitting frequency point of the target base station is consistent with the beacon frame receiving frequency point of the terminal, and the target base station and the terminal can communicate with each other by using the changed frequency point.

In some embodiments, a base station receives a first beacon frequency point request message transmitted by a server and transmits the first beacon frequency point request message to a terminal, so that the terminal changes a beacon frame receiving frequency point according to first frequency information in the first beacon frequency point request message. A beacon frequency point acknowledgment message corresponding to the first beacon frequency point request message and transmitted by the terminal is received, the beacon frequency point acknowledgment message including base station position information and the signal strength information is transmitted to the server, a second beacon frequency point request message transmitted by the server is received, and a beacon transmitting frequency point is changed according to the first frequency point information in the second beacon frequency point request message. After receiving a beacon frequency point acknowledgment message indicating that the terminal changes a frequency point according to the first beacon frequency point request message, the server calculates a moving trajectory of the terminal according to a position of a current base station and a signal strength of communication between the current base station and the terminal in the beacon frequency point acknowledgment message, so as to determine a target base station, and timely transmits the second beacon frequency point request message to the target base station to instruct the target base station to change a frequency point to be suitable for a scenario of the movement of the terminal, so that the target base station can communicate with the terminal on a correct frequency point after the terminal moves to a coverage area of the target base station.

Figure 5:
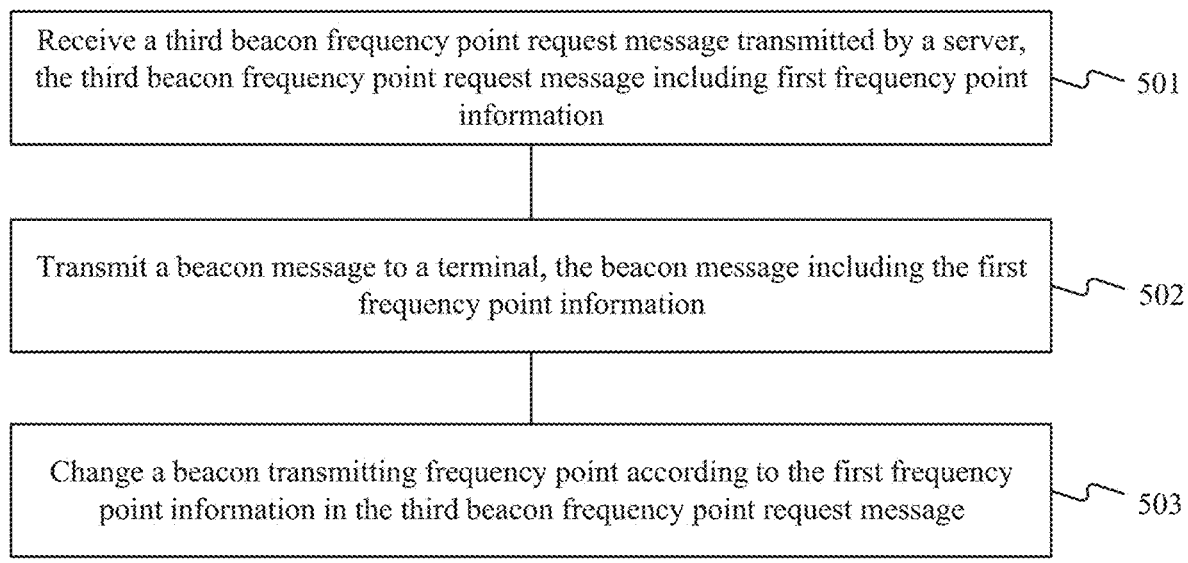
FIG. 5 is a flowchart of an exemplary frequency point changing method, consistent with some embodiments of the present disclosure.

FIG. 5 is a flowchart of an exemplary frequency point changing method, consistent with some embodiments of the present disclosure. The method is applicable to a wireless network. The wireless network includes a terminal, a server, and a base station connected to the terminal and the server. The method can specifically include the following steps:

In step 501, receiving a third beacon frequency point request message transmitted by a server is performed, the third beacon frequency point request message comprising first frequency point information.

In some embodiments, when the server requires the base station to change a frequency point, a third beacon frequency point request message can be transmitted to the base station, and the third beacon frequency point request message instructs the base station to change a beacon transmitting frequency point.

Optionally, the third beacon frequency point request message can also be a second beacon frequency point request message.

In step 502, transmitting a beacon message to a terminal, the beacon message comprising the first frequency point information is performed.

In some embodiments, the base station can instruct all terminals connected to the base station to change frequency points. Specifically, step 502 can include the following sub-steps.

In sub-step S5021, acquiring the first frequency point information in the third beacon frequency point request message is performed.

In sub-step S5022, generating a beacon message, the beacon message comprising the first frequency point information is performed.

In particular, the first frequency point information can be placed in an expandable field of a beacon message (Beacon).

In sub-step S5023, transmitting the beacon message to the terminal is performed.

Specifically, in some embodiments, after receiving the third beacon frequency point request message, the base station parses the third beacon frequency point request message to obtain the first frequency point information. The first frequency point information corresponds to a frequency point after the terminal changes the frequency point.

The beacon message is a broadcast message, and all terminals within a signal coverage area of the base station can receive and respond to the beacon message. That is, all terminals connected to the base station can be instructed through the beacon message to change a frequency point.

In some embodiments, the beacon frequency point request message further includes a delay time, and step 502 can include the following sub-steps.

In sub-step S5024, acquiring the first frequency point information and the delay time in the third beacon frequency point request message is performed.

In sub-step S5025, generating a beacon message, the beacon message including the first frequency point information and the delay time is performed.

In sub-step S5026, transmitting the beacon message to the terminal is performed.

The server can set a delay time for frequency point change according to an actual situation, and instruct the base station and the terminal to change a frequency point after the timeout of the delay time. After receiving the third beacon frequency point request message, the base station can generate beacon information according to the first frequency point information and the delay time therein and transmit the beacon information to the terminal.

In some embodiments, the base station can generate a delay time, and step 502 can include the following sub-steps.

In sub-step S5027, acquiring the first frequency point information in the third beacon frequency point request message is performed.

In sub-step S5028, generating a delay time is performed.

In sub-step S5029, generating a beacon message, the beacon message comprising the first frequency point information and the delay time is performed.

In sub-step S50210, transmitting the beacon message to the terminal is performed.

The base station can set a delay time for frequency point change according to an actual situation, and instruct the terminal to change a frequency point after the timeout of the delay time. After receiving the third beacon frequency point request message, the base station can generate a delay time, generate beacon information according to the first frequency point information and the delay time in the third beacon frequency point request message, and transmit the beacon information to the terminal.

In step 503, changing a beacon transmitting frequency point according to the first frequency point information in the third beacon frequency point request message is performed.

Specifically, after receiving the third beacon frequency point request message, the base station changes a current beacon transmitting frequency point to a frequency point corresponding to the first frequency point information.

If the third beacon frequency point request message includes a delay time, the current beacon transmitting frequency point is changed to the frequency point corresponding to the first frequency point information after the timeout of the delay time. For example, the delay time is 2 beacon periods, and the base station changes the current beacon transmitting frequency point to the frequency point corresponding to the first frequency point information after 2 beacon periods.

In some embodiments, the third beacon frequency point request message includes a change time. After acquiring a current time, the base station determines whether the current time is the change time, and if yes, changes a current frequency point to a frequency point corresponding to the first frequency point information, so that the frequency point of the base station is consistent with the frequency point of the terminal, and the base station and the terminal can communicate with each other by using the changed frequency point.

In some embodiments, the method further includes the following step: transmitting the beacon frame to the terminal through the changed beacon transmitting frequency point.

In some embodiments, after receiving a third beacon frequency point request message transmitted by a server, a base station transmits a beacon message to a terminal and can instruct, through the beacon, a plurality of terminals to change frequency points at the same time, which is suitable for scenarios where the base station simultaneously changes frequency points of a plurality of terminals, so that the base station and all terminals connected to the base station can simultaneously change frequency points after a delay time, and the base station and the terminals can communicate with each other through the changed frequency points.

In some embodiments, a plurality of terminals can be simultaneously instructed through a beacon message to change frequency points at the same time, which reduces the amount of signaling between the server and the base station and between the base station and the terminals, thereby saving timeslot resources.

Figure 6:
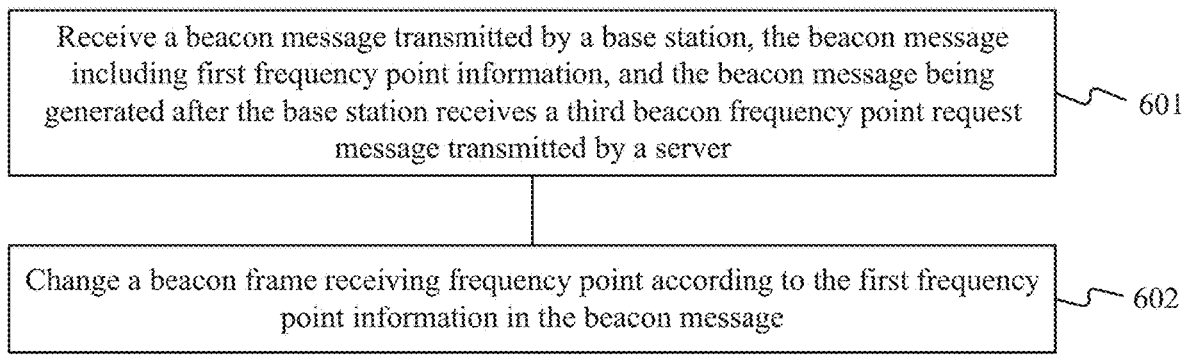
FIG. 6 is a flowchart of an exemplary frequency point changing method, consistent with some embodiments of the present disclosure.

FIG. 6 is a flowchart of an exemplary frequency point changing method, consistent with some embodiments of the present disclosure. The method is applicable to a wireless network. The wireless network includes a terminal, a server, and a base station connected to the terminal and the server. The method can specifically include the following steps:

In step 601, receiving a beacon message transmitted by a base station is performed, the beacon message including first frequency point information, and the beacon message being generated after the base station receives a third beacon frequency point request message transmitted by a server.

In some embodiments, since the base station transmits a beacon message or a beacon frame, all terminals connected to the base station can receive the beacon message. The beacon message is generated by the base station according to the third message transmitted by the server. For example, the base station generates a beacon message according to the first frequency point information and the delay time in the third beacon frequency point request message, and broadcasts the beacon message to all the terminals connected to the base station.

In step 602, changing a beacon frame receiving frequency point according to the first frequency point information in the beacon message is performed.

After receiving the beacon message, the terminal can change a frequency point, which can specifically include the following sub-steps.

In sub-step S6021, acquiring the first frequency point information in the beacon message is performed.

In sub-step S6022, changing a current beacon frame receiving frequency point to a frequency point corresponding to the first frequency point information is performed.

Specifically, in some embodiments, after parsing the first frequency point information from the beacon message, the terminal can change a beacon frame receiving frequency point to a frequency point corresponding to the first frequency point information.

In some embodiments, the beacon message further includes a delay time, and step 602 can include the following sub-steps.

In sub-step S6023, acquiring the first frequency point information and the delay time in the beacon message is performed.

In sub-step S6024, changing a current beacon frame receiving frequency point to a frequency point corresponding to the first frequency point information after the timeout of the delay time is performed.

In some embodiments, since the base station does not need to wait for a beacon frequency point acknowledgment message of the terminal to change a frequency point, it can agree, in a beacon message, a delay time for frequency point change with the terminal, and the terminal can obtain first frequency point information and a delay time after parsing the beacon message. For example, the terminal first determines whether the beacon message includes first frequency point information, that is, whether the beacon message is a beacon message for frequency point change; if the beacon message includes the first frequency point information, the terminal determines whether a delay time is included; if the delay time is included, the terminal changes a current beacon frame receiving frequency point to a frequency point corresponding to the first frequency point information after the timeout of the delay time; if the delay time is not included, the terminal can immediately change a frequency point, and if the first frequency point information is not included, the terminal does not change any frequency point.

In some embodiments, after receiving a beacon message generated by a base station according to a third beacon frequency point request message transmitted by a server, a terminal changes a beacon frame receiving frequency point according to the first frequency point information in the beacon message, so that the base station can instruct at the same time, through the beacon message, a plurality of terminals to change frequency points, which is suitable for scenarios where the base station simultaneously changes frequency points of a plurality of terminals. As a result, the base station and all terminals connected to the base station can change frequency points timely or after the timeout of the delay time, and the base station and the terminals can communicate with each other through the changed frequency points.

In some embodiments, a plurality of terminals can be simultaneously instructed through a beacon message to change frequency points at the same time, which reduces the amount of signaling between the server and the base station and between the base station and the terminals, thereby saving timeslot resources.

Figure 7:
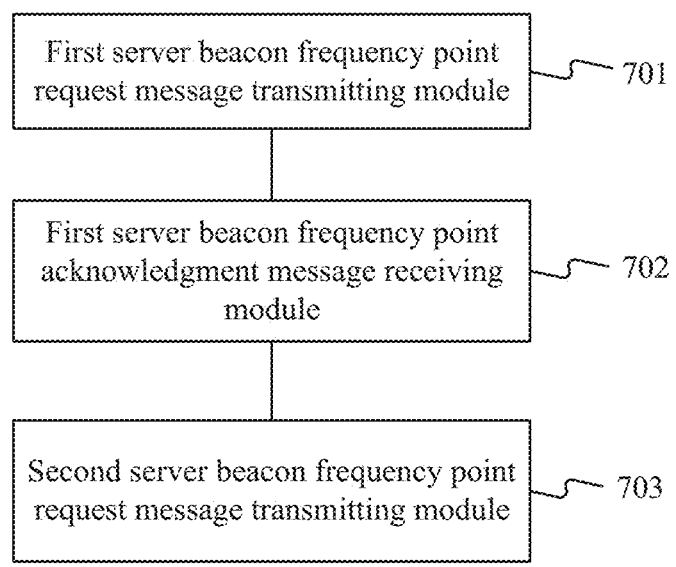
FIG. 7 is a schematic diagram of an exemplary frequency point changing apparatus, consistent with some embodiments of the present disclosure.

FIG. 7 is a schematic diagram of an exemplary frequency point changing apparatus, consistent with some embodiments of the present disclosure. The apparatus is applicable to a wireless network. The wireless network includes a terminal, a server, and a base station connected to the terminal and the server. The apparatus includes a first server beacon frequency point request message transmitting module 701, a first server beacon frequency point acknowledgment message receiving module 702, and a second server beacon frequency point request message transmitting module 703.

First server beacon frequency point request message transmitting module 701 is configured to transmit a first beacon frequency point request message to a first base station, the first beacon frequency point request message including first frequency point information, the first base station transmitting the first beacon frequency point request message to a terminal, and the terminal changing a beacon frame receiving frequency point according to the first frequency point information in the first beacon frequency point request message.

First server beacon frequency point acknowledgment message receiving module 702 is configured to receive a beacon frequency point acknowledgment message transmitted by at least one second base station.

Second server beacon frequency point request message transmitting module 703 is configured to transmit a second beacon frequency point request message to the at least one second base station, the second beacon frequency point request message including the first frequency point information, and the at least one second base station changing a beacon transmitting frequency point according to the first frequency point information in the second beacon frequency point request message.

Optionally, the beacon frequency point acknowledgment message includes status information of the terminal, the status information includes frequency point change confirmation information, and second server beacon frequency point request message transmitting module 703 includes: an acknowledgment message and base station identifier receiving sub-module configured to receive the beacon frequency point acknowledgment message and a base station identifier transmitted by the at least one second base station; a target base station determining sub-module configured to determine at least one target base station from the at least one second base station according to at least one base station identifier; and a first beacon frequency point request message transmitting sub-module configured to transmit the second beacon frequency point request message to the at least one target base station, the second beacon frequency point request message including the first frequency point information, so that the target base station changes the beacon transmitting frequency point according to the first frequency point information.

Optionally, the second beacon frequency point request message includes the delay time, so that the target base station changes the beacon transmitting frequency point according to the first frequency point information and after the delay time.

Figure 8:
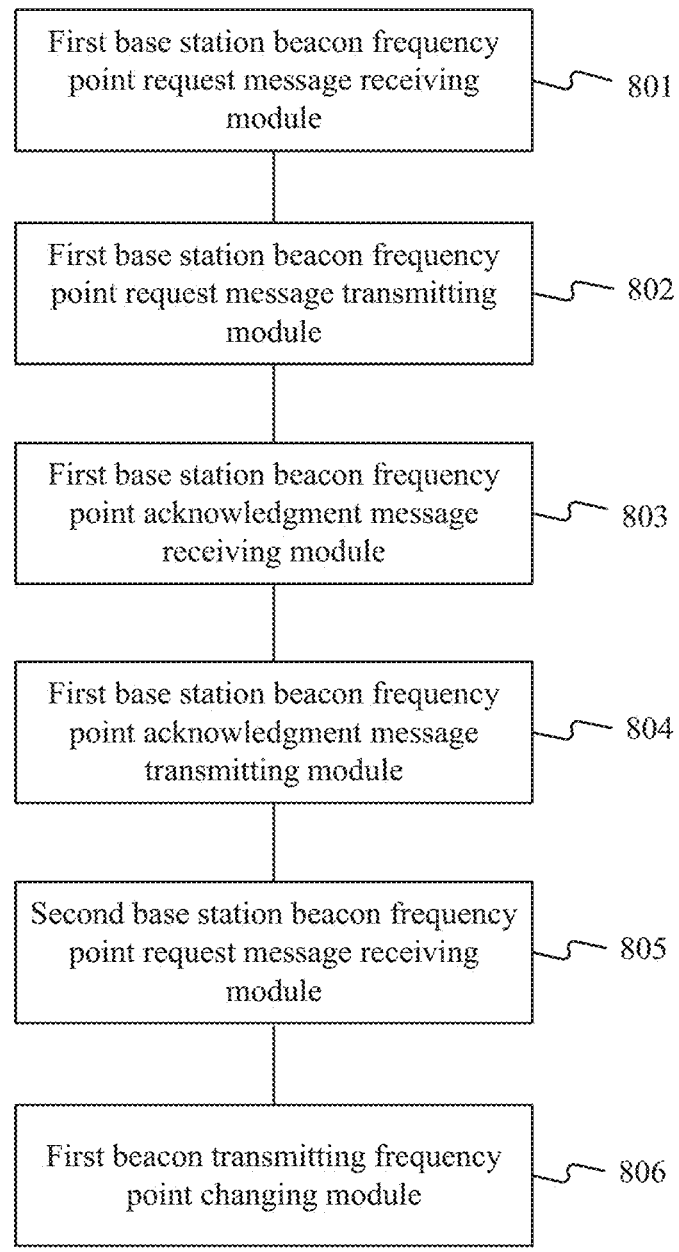
FIG. 8 is a schematic diagram of an exemplary frequency point changing apparatus, consistent with some embodiments of the present disclosure.

FIG. 8 is a schematic diagram of an exemplary frequency point changing apparatus, consistent with some embodiments of the present disclosure. The apparatus is applicable to a wireless network. The wireless network includes a terminal, a server, and a base station connected to the terminal and the server. The apparatus includes: a first base station beacon frequency point request message receiving module 801, a first base station beacon frequency point request message transmitting module 802, first base station beacon frequency point acknowledgment message receiving module 803, first base station beacon frequency point acknowledgment message transmitting module 804, second base station beacon frequency point request message receiving module 805, and first beacon transmitting frequency point changing module 806.

First base station beacon frequency point request message receiving module 801 is configured to receive a first beacon frequency point request message transmitted by a server, the first beacon frequency point request message including first frequency point information.

First base station beacon frequency point request message transmitting module 802 is configured to transmit the first beacon frequency point request message to a terminal, so that the terminal changes a beacon frame receiving frequency point according to the first frequency point information in the first beacon frequency point request message.

First base station beacon frequency point acknowledgment message receiving module 803 is configured to receive a beacon frequency point acknowledgment message corresponding to the first beacon frequency point request message and transmitted by the terminal.

First base station beacon frequency point acknowledgment message transmitting module 804 is configured to transmit the beacon frequency point acknowledgment message to the server.

Second base station beacon frequency point request message receiving module 805 is configured to receive a second beacon frequency point request message transmitted by the server, the second beacon frequency point request message including the first frequency point information.

First beacon transmitting frequency point changing module 806 is configured to change a beacon transmitting frequency point according to the first frequency point information in the second beacon frequency point request message.

Optionally, the first base station beacon frequency point acknowledgment message transmitting module includes: a first base station beacon frequency point acknowledgment message and base station identifier transmitting sub-module configured to transmit the beacon frequency point acknowledgment message and a base station identifier to the server.

Optionally, the second beacon frequency point request message further includes a delay time, and first beacon transmitting frequency point changing module 806 includes: a first beacon transmitting frequency point changing sub-module configured to change the beacon transmitting frequency point according to the first frequency point information and after the delay time.

Figure 9:
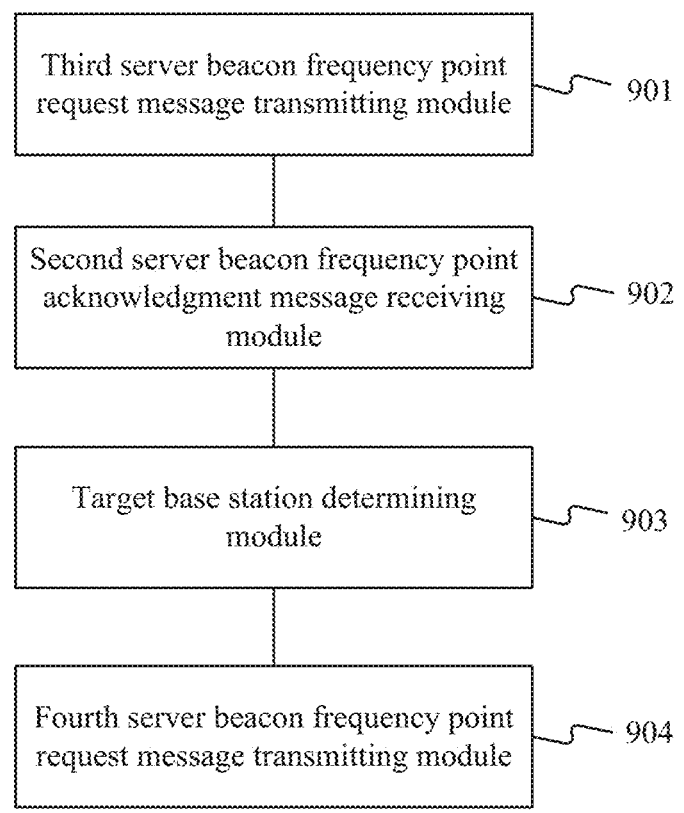
FIG. 9 is a schematic diagram of an exemplary frequency point changing apparatus, consistent with some embodiments of the present disclosure.

FIG. 9 is a schematic diagram of an exemplary frequency point changing apparatus, consistent with some embodiments of the present disclosure. The apparatus is applicable to a wireless network. The wireless network includes a terminal, a server, and a base station connected to the terminal and the server. The apparatus includes: a third server beacon frequency point request message transmitting module 901, a second server beacon frequency point acknowledgment message receiving module 902, target base station determining module 903, and a fourth server beacon frequency point request message transmitting module 904.

Third server beacon frequency point request message transmitting module 901 is configured to transmit a first beacon frequency point request message to a first base station, the first beacon frequency point request message including first frequency point information, the first base station transmitting the first beacon frequency point request message to a terminal, and the terminal changing a beacon frame receiving frequency point according to the first frequency point information in the first beacon frequency point request message.

Second server beacon frequency point acknowledgment message receiving module 902 is configured to receive a beacon frequency point acknowledgment message corresponding to the first beacon frequency point request message and transmitted by at least one second base station, the beacon frequency point acknowledgment message including base station position information of the at least one second base station and signal strength information of communication between the terminal and the at least one second base station.

Target base station determining module 903 is configured to determine at least one target base station from the at least one second base station according to the base station position information and the signal strength information.

Fourth server beacon frequency point request message transmitting module 904 is configured to transmit a second beacon frequency point request message to the at least one target base station, the second beacon frequency point request message including the first frequency point information, and the at least one target base station changing a beacon transmitting frequency point according to the first frequency point information.

Optionally, target base station determining module 903 includes: a trajectory calculating sub-module configured to calculate a moving trajectory of the terminal according to the base station position information and the signal strength information; and a target base station determining sub-module configured to determine a second base station within a preset distance from the moving trajectory as the target base station.

Optionally, the second beacon frequency point request message includes a delay time, so that the target base station changes the beacon transmitting frequency point according to the first frequency point information and after the timeout of the delay time.

Figure 10:
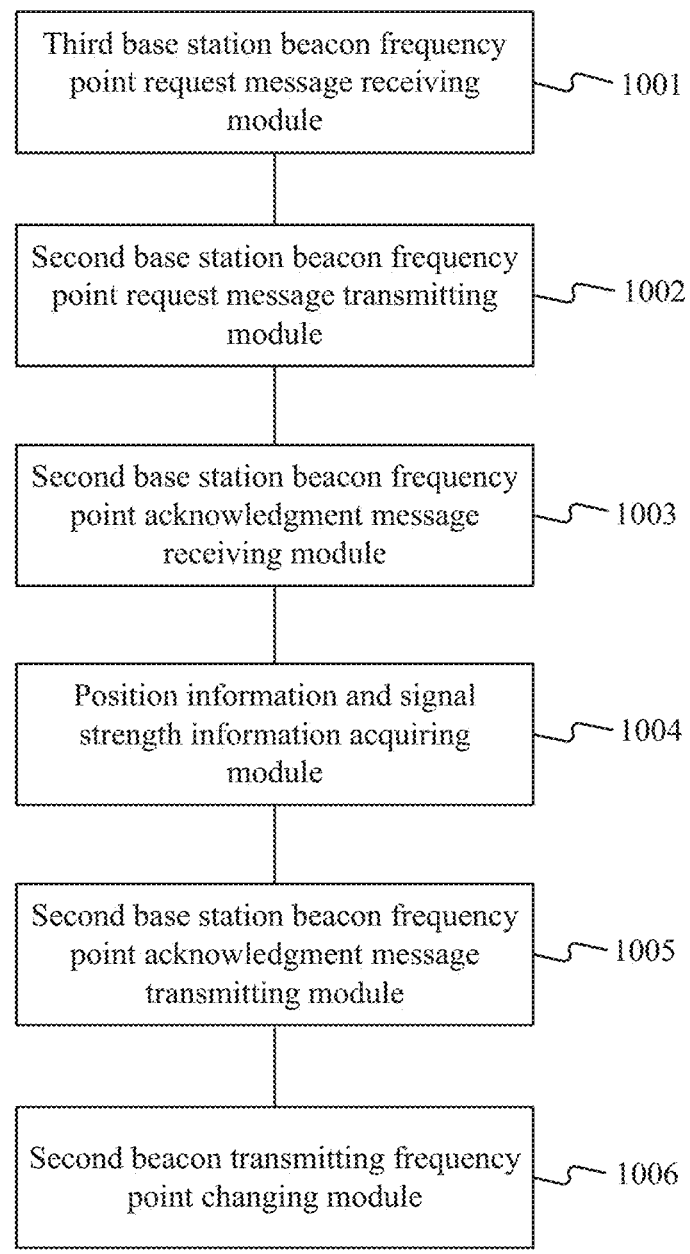
FIG. 10 is a schematic diagram of an exemplary frequency point changing apparatus, consistent with some embodiments of the present disclosure.

FIG. 10 is a schematic diagram of an exemplary frequency point changing apparatus, consistent with some embodiments of the present disclosure. The apparatus is applicable to a wireless network. The wireless network includes a terminal, a server, and a base station connected to the terminal and the server. The apparatus includes: a third base station beacon frequency point request message receiving module 1001, a second base station beacon frequency point request message transmitting module 1002, a second base station beacon frequency point acknowledgment message receiving module 1003, a position information and signal strength information acquiring module 1004, a second base station beacon frequency point acknowledgment message transmitting module 1005, and a second beacon transmitting frequency point changing module 1006.

Third base station beacon frequency point request message receiving module 1001 is configured to receive a first beacon frequency point request message transmitted by a server, the first beacon frequency point request message including first frequency point information.

Second base station beacon frequency point request message transmitting module 1002 is configured to transmit the first beacon frequency point request message to a terminal, so that the terminal changes a beacon frame receiving frequency point according to the first frequency point information in the first beacon frequency point request message.

Second base station beacon frequency point acknowledgment message receiving module 1003 is configured to receive a beacon frequency point acknowledgment message corresponding to the first beacon frequency point request message and transmitted by the terminal.

Position information and signal strength information acquiring module 1004 is configured to acquire base station position information of a current base station and signal strength information of communication between the terminal and the current base station.

Second base station beacon frequency point acknowledgment message transmitting module 1005 is configured to transmit the beacon frequency point acknowledgment message to the server, the beacon frequency point acknowledgment message including the base station position information and the signal strength information.

Second beacon transmitting frequency point changing module 1006 is configured to receive a second beacon frequency point request message including the first frequency point information and transmitted by the server, and change a beacon transmitting frequency point according to the first frequency point information.

Optionally, the second beacon frequency point request message further includes a delay time, and second beacon transmitting frequency point changing module 1006 includes: a first beacon transmitting frequency point changing sub-module configured to change the beacon transmitting frequency point according to the first frequency point information and after the timeout of the delay time.

Figure 11:
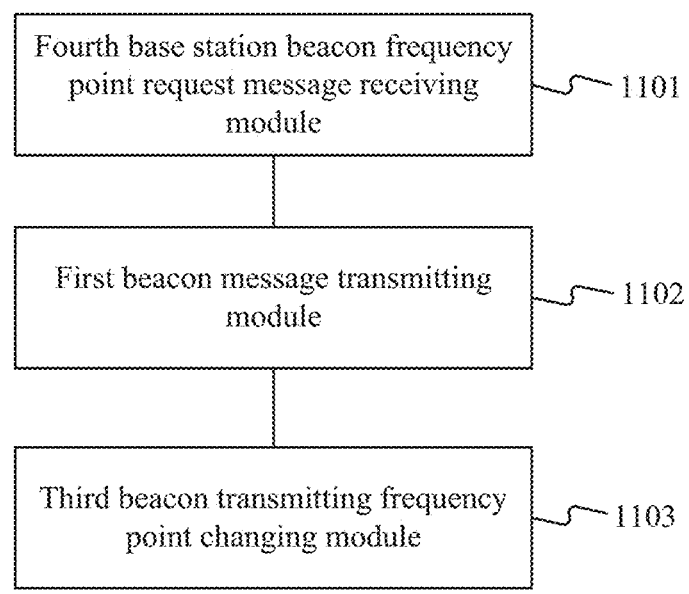
FIG. 11 is schematic diagram of an exemplary frequency point changing apparatus, consistent with some embodiments of the present disclosure.

FIG. 11 is schematic diagram of an exemplary frequency point changing apparatus, consistent with some embodiments of the present disclosure. The apparatus is applicable to a wireless network. The wireless network includes a terminal, a server, and a base station connected to the terminal and the server. The apparatus includes: a fourth base station beacon frequency point request message receiving module 1101, a first beacon message transmitting module 1102, and a third beacon transmitting frequency point changing module 1103.

Fourth base station beacon frequency point request message receiving module 1101 is configured to receive a third beacon frequency point request message transmitted by a server, the third beacon frequency point request message including first frequency point information.

First beacon message transmitting module 1102 is configured to transmit a beacon message to a terminal, the beacon message including the first frequency point information.

Third beacon transmitting frequency point changing module 1103 is configured to change a beacon transmitting frequency point according to the first frequency point information in the third beacon frequency point request message.

Optionally, first beacon message transmitting module 1102 includes: a first frequency point information acquiring sub-module configured to acquire the first frequency point information in the third beacon frequency point request message; a first beacon message generating sub-module configured to generate a beacon message, the beacon message including the first frequency point information; and a first beacon message transmitting sub-module configured to transmit the beacon message to the terminal.

Optionally, the third beacon frequency point request message further includes a delay time, and first beacon message transmitting module 1102 includes: a base station side first frequency point information and delay time acquiring sub-module configured to acquire the first frequency point information and the delay time in the third beacon frequency point request message; a second beacon message generating sub-module configured to generate a beacon message, the beacon message including the first frequency point information and the delay time; and a second beacon message transmitting sub-module configured to transmit the beacon message to the terminal.

Optionally, the first beacon message transmitting module includes: a second frequency point information acquiring sub-module configured to acquire the first frequency point information in the third beacon frequency point request message; a delay time generating sub-module configured to generate a delay time; a third beacon message generating sub-module configured to generate a beacon message, the beacon message including the first frequency point information and the delay time; and a third beacon message transmitting sub-module configured to transmit the beacon message to the terminal.

Optionally, third beacon transmitting frequency point changing module 1103 includes: a second beacon transmitting frequency point changing sub-module configured to change a current beacon transmitting frequency point to a frequency point corresponding to the first frequency point information.

Optionally, third beacon transmitting frequency point changing module 1103 includes: a first beacon transmitting frequency point changing sub-module configured to change a current beacon transmitting frequency point to a frequency point corresponding to the first frequency point information after the delay time.

Optionally, the apparatus further includes: a second beacon message transmitting module configured to transmit a beacon message to the terminal through the changed beacon transmitting frequency point.

Figure 12:
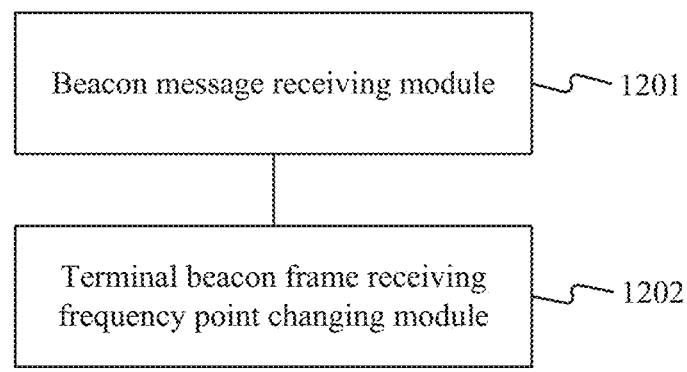
FIG. 12 is a schematic diagram of an exemplary frequency point changing apparatus, consistent with some embodiments of the present disclosure.

FIG. 12 is a schematic diagram of an exemplary frequency point changing apparatus, consistent with some embodiments of the present disclosure. The apparatus is applicable to a wireless network. The wireless network includes a terminal, a server, and a base station connected to the terminal and the server. The apparatus includes: a beacon message receiving module 1201 configured to receive a beacon message transmitted by a base station, the beacon message including first frequency point information, and the beacon message being generated after the base station receives a third beacon frequency point request message transmitted by a server; and a terminal beacon frame receiving frequency point changing module 1202 configured to change a beacon frame receiving frequency point according to the first frequency point information in the beacon message.

Optionally, beacon message receiving module 1201 includes: a first frequency point information acquiring sub-module configured to acquire the first frequency point information in the beacon message; and a first terminal beacon frame receiving frequency point changing sub-module configured to change a current beacon transmitting frequency point to a frequency point corresponding to the first frequency point information.

Optionally, the beacon message further includes a delay time, and terminal beacon frame receiving frequency point change module 1202 includes: a terminal side first frequency point information and delay time acquiring sub-module configured to acquire the first frequency point information and the delay time in the beacon message; and a second terminal beacon frame receiving frequency point changing sub-module configured to change a current beacon transmitting frequency point to a frequency point corresponding to the first frequency point information after the delay time.

The embodiments further provide an apparatus, including: one or more processors; and one or more machine-readable media on which instructions are stored. When executed by the one or more processors, the instructions cause the apparatus to perform the above methods.

These computer program instructions can also be stored in a computer-readable memory that can direct a computer or another programmable data processing terminal device to work in a specific manner, so that the instructions stored in this computer-readable memory produce an article of manufacture including an instruction apparatus which implements the functions specified in one or more flows of the flowcharts and/or one or more blocks of the block diagrams.

These computer program instructions can also be loaded onto a computer or another programmable data processing terminal device, so that a series of operation steps are performed on the computer or another programmable terminal device to produce computer-implemented processing, so that the instructions executed on the computer or another programmable terminal device provide steps for implementing the functions specified in one or more flows of the flowcharts and/or one or more blocks of the block diagrams.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

What is claimed is:

1. A frequency point changing method performed by a base station, the method comprising:
receiving a beacon frequency point request message transmitted by a server, the beacon frequency point request message comprising frequency point information and the beacon frequency point request message being generated according to a beacon frequency point acknowledge message from a terminal in response to a prior beacon frequency point request message;
broadcasting a beacon message to all terminals within a signal coverage area of the base station, the beacon message and the prior beacon frequency point request message comprising the frequency point information; and
changing a beacon transmitting frequency point according to the frequency point information in the beacon frequency point request message.

2. The method of claim 1, wherein broadcasting the beacon message to all terminals within the signal coverage area of the base station comprises:
acquiring the frequency point information in the beacon frequency point request message;
generating the beacon message, the beacon message comprising the frequency point information; and
broadcasting the beacon message to the terminals.

3. The method of claim 1, wherein the beacon frequency point request message further comprises a delay time, and broadcasting the beacon message to all terminals within the signal coverage area of the base station comprises:
acquiring the frequency point information and the delay time in the beacon frequency point request message;
generating the beacon message, the beacon message comprising the frequency point information and the delay time; and
broadcasting the beacon message to the terminals.

4. The method of claim 3, wherein changing the beacon transmitting frequency point according to the frequency point information in the beacon frequency point request message comprises:
changing the beacon transmitting frequency point to a frequency point corresponding to the frequency point information after the delay time having ended.

5. The method of claim 1, wherein broadcasting the beacon message to all terminals within the signal coverage area of the base station comprises:
acquiring the frequency point information in the beacon frequency point request message;
generating a delay time;
generating the beacon message, the beacon message comprising the frequency point information and the delay time; and
broadcasting the beacon message to the terminals.

6. The method of claim 1, wherein changing the beacon transmitting frequency point according to the frequency point information in the beacon frequency point request message comprises:

changing the beacon transmitting frequency point to a frequency point corresponding to the frequency point information.

7. The method of claim 1, further comprising:
broadcasting the beacon message to the terminals through the changed beacon transmitting frequency point.

8. A frequency point changing apparatus, comprising:
a memory storing a set of instructions; and
one or more processors configured to execute the set of instructions to cause the apparatus to perform:
receiving a beacon frequency point request message transmitted by a server, the beacon frequency point request message comprising frequency point information and the beacon frequency point request message being generated according to a beacon frequency point acknowledge message from a terminal in response to a prior beacon frequency point request message;
broadcasting a beacon message to all terminals within a signal coverage area of the base station, the beacon message and the prior beacon frequency point request message comprising the frequency point information; and
changing a beacon transmitting frequency point according to the frequency point information in the beacon frequency point request message.

9. The apparatus of claim 8, wherein broadcasting the beacon message to all terminals within the signal coverage area of the base station comprises:
acquiring the frequency point information in the beacon frequency point request message;
generating the beacon message, the beacon message comprising the frequency point information; and
broadcasting the beacon message to the terminals.

10. The apparatus of claim 8, wherein the beacon frequency point request message further comprises a delay time, and broadcasting the beacon message to all terminals within the signal coverage area of the base station comprises:
acquiring the frequency point information and the delay time in the beacon frequency point request message;
generating the beacon message, the beacon message comprising the frequency point information and the delay time; and
broadcasting the beacon message to the terminals.

11. The apparatus of claim 10, wherein changing the beacon transmitting frequency point according to the frequency point information in the beacon frequency point request message comprises:
changing the beacon transmitting frequency point to a frequency point corresponding to the frequency point information after the delay time having ended.

12. The apparatus of claim 8, wherein broadcasting the beacon message to all terminals within the signal coverage area of the base station comprises:
acquiring the frequency point information in the beacon frequency point request message;
generating a delay time;
generating the beacon message, the beacon message comprising the frequency point information and the delay time; and
broadcasting the beacon message to the terminals.

13. The apparatus of claim 8, wherein changing the beacon transmitting frequency point according to the frequency point information in the beacon frequency point request message comprises:
changing the beacon transmitting frequency point to a frequency point corresponding to the frequency point information.

14. A non-transitory computer readable medium that stores a set of instructions that is executable by at least one processor of a computer to cause the computer to perform a frequency point changing method, the method comprising:
receiving a beacon frequency point request message transmitted by a server, the beacon frequency point request message comprising frequency point information and the beacon frequency point request message being generated according to a beacon frequency point acknowledge message from a terminal in response to a prior beacon frequency point request message;
broadcasting a beacon message to all terminals within a signal coverage area of the base station, the beacon message and the prior beacon frequency point request message comprising the frequency point information; and
changing a beacon transmitting frequency point according to the frequency point information in the beacon frequency point request message.

15. The non-transitory computer readable medium of claim 14, wherein broadcasting the beacon message to all terminals within the signal coverage area of the base station comprises:
acquiring the frequency point information in the beacon frequency point request message;
generating the beacon message, the beacon message comprising the frequency point information; and
broadcasting the beacon message to the terminals.

16. The non-transitory computer readable medium of claim 15, wherein the beacon frequency point request message further comprises a delay time, and broadcasting the beacon message to all terminals within the signal coverage area of the base station comprises:
acquiring the frequency point information and the delay time in the beacon frequency point request message;
generating the beacon message, the beacon message comprising the frequency point information and the delay time; and
broadcasting the beacon message to the terminals.

17. The non-transitory computer readable medium of claim 16, wherein changing the beacon transmitting frequency point according to the frequency point information in the beacon frequency point request message comprises:
changing the beacon transmitting frequency point to a frequency point corresponding to the frequency point information after the delay time having ended.

18. The non-transitory computer readable medium of claim 14, wherein broadcasting the beacon message to all terminals within the signal coverage area of the base station comprises:
acquiring the frequency point information in the beacon frequency point request message;
generating a delay time;
generating the beacon message, the beacon message comprising the frequency point information and the delay time; and
broadcasting the beacon message to the terminals.

19. The non-transitory computer readable medium of claim 14, wherein changing the beacon transmitting frequency point according to the frequency point information in the beacon frequency point request message comprises:
changing the beacon transmitting frequency point to a frequency point corresponding to the frequency point information.

20. The non-transitory computer readable medium of claim 14, wherein the at least one processor configured to execute the set of instructions to cause the computer to further perform:
 broadcasting the beacon message to the terminals through the changed beacon transmitting frequency point.

* * * * *